United States Patent
Whitten et al.

(10) Patent No.: US 6,588,989 B2
(45) Date of Patent: Jul. 8, 2003

(54) HANDLING APPARATUS FOR ELASTIC TUBULAR MEMBERS HAVING A SINGLE CLOSED END

(75) Inventors: James R. Whitten, Sylvestes, GA (US); Brian A. Gobrogge, Albany, GA (US); Ken Thompson, Fitzgerald, GA (US)

(73) Assignee: Agri Dynamics, Inc., Albany, GA (US)

( * ) Notice: Subject to any disclaimer, the term of this patent is extended or adjusted under 35 U.S.C. 154(b) by 0 days.

(21) Appl. No.: 09/917,366

(22) Filed: Jul. 27, 2001

(65) Prior Publication Data
US 2003/0021639 A1 Jan. 30, 2003

(51) Int. Cl.$^7$ .............................................. B65G 51/00
(52) U.S. Cl. ..................... 406/198; 406/83; 406/157; 406/176; 406/181; 406/180
(58) Field of Search ..................... 406/83, 157, 163, 406/176, 177, 179, 180, 181, 198; 414/755

(56) References Cited

U.S. PATENT DOCUMENTS

| | | | | |
|---|---|---|---|---|
| 3,332,724 A | * | 7/1967 | Doucet | 406/82 |
| 3,844,621 A | * | 10/1974 | Tiranov et al. | 406/154 |
| 5,499,898 A | * | 3/1996 | Vonier et al. | 414/755 |
| 5,564,552 A | * | 10/1996 | Vonier et al. | 198/409 |
| 6,044,693 A | * | 4/2000 | Sisbarro et al. | 73/41 |
| 6,375,393 B1 | * | 4/2002 | Migliorini | 406/181 |

* cited by examiner

Primary Examiner—Joseph A. Dillon
(74) Attorney, Agent, or Firm—Thomas C. Saitta

(57) ABSTRACT

An apparatus for handling and orienting elastic, thin-walled, tubular members having a closed end and an open end, such as finger cots, such that all tubular members are delivered in the same orientation, the apparatus having a retrieval conduit, a delivery conduit angularly joined to the retrieval conduit, a reversing chamber extending linearly forward from the retrieval conduit and across the opening to the delivery conduit, and suction means to draw the tubular members through the retrieval and delivery conduits. A tubular member traveling in the forward orientation with the closed end forward will be drawn directly into the delivery conduit, while a tubular member traveling in the reverse orientation with the open end forward will first pass the opening to the delivery conduit and strike the barrier end wall of the reversing chamber, and then be drawn into the delivery conduit with the closed end forward.

10 Claims, 5 Drawing Sheets

US 6,588,989 B2

HANDLING APPARATUS FOR ELASTIC TUBULAR MEMBERS HAVING A SINGLE CLOSED END

BACKGROUND OF THE INVENTION

This invention relates in general to apparatuses, machines, devices or other equipment for handling elastic, thin-walled, elongated, tubular members having a single closed end, such as finger cots, condoms, balloons or the like. In particular, the invention relates to such apparatuses which orient the tubular members in a desired orientation, and even more particularly to such apparatuses which utilize suction to transport the tubular members from a first location to a second location, where the tubular members are randomly oriented when received from the first location but are identically oriented when delivered to the second location.

Tubular members such as finger cots, condoms, balloons and the like are formed of elastic polymeric material and typically are relatively thin with a generally elongated body shape, such that the longitudinal axis is greater than the diameter, where one end is closed and the other end is open. Usually, wall material is rolled to form a ring on the open end. Such members are difficult to handle in bulk because of the elasticity and friction characteristics inherent in the material of construction, the lack of structural rigidity, the relatively small size, the ease of rupture if mishandled and other factors. It is desirable in many circumstances, and sometimes required, that individual members be processed in some manner. For example, condoms must be tested by stretching each condom onto a testing mandrel. Balloons may need to be imprinted with designs or lettering.

One of the problems encountered in handling these types of tubular members is orientation, whereby it is often necessary that each individual member be oriented in like manner for a particular handling, processing or testing operation. For example, it will often be necessary for all the individual members to be delivered to a particular location either open end first or closed end first. It is therefore an object of this invention to provide an apparatus or structure which may be incorporated into a tubular member handling apparatus which rapidly and simply orients the tubular members such that they are all delivered in like orientation. It is a further object to provide such an apparatus which can be applied to any handling apparatus wherein the tubular members are individually transported by suction from a first location to a second location. These and other objects not expressed in this section will be apparent from and will be accomplished as described in the disclosure which follows.

SUMMARY OF THE INVENTION

The invention is in general an apparatus, device or structure for handling and orienting elastic, thin-walled, generally elongated, tubular members having a closed end and an open end, such as for example finger cots, condoms, balloons or the like, such that individual tubular members are received from a first location in random orientation and delivered to a second location with all tubular members oriented in the same manner. The invention comprises in general a first suction or retrieving conduit for receiving the randomly oriented tubular members, a second suction or delivery conduit for delivering the tubular members in identically oriented manner, said delivery conduit being mounted at an angle to said retrieving tube to form a junction, with the angle preferably being a right angle, and a reversing chamber extending generally linearly or coaxially from the retrieval conduit a short distance beyond the junction and opening of the delivery conduit into the retrieval conduit, where the reversing chamber has a closed end wall, and suction means to draw the tubular members individually through said retrieving and delivery conduits. The conduits are preferably circular in cross-section and are chosen to be slightly greater in diameter than the cross-section diameter of the particular tubular members being handled. The reversing chamber extends beyond the junction between the first suction conduit and the second suction conduit a distance preferably less than the overall length of the tubular member in the unstretched state.

The retrieval conduit is preferably of significantly greater length than that of the tubular members, such that friction effects between the tubular member and the inner walls of the retrieval conduit during passage of the tubular member will position the tubular member in a generally linear fashion, such that the longitudinal axis of the tubular member is parallel or coaxial with the central axis of the retrieval conduit. As the tubular member reaches the opening of the delivery conduit, one of two scenarios will occur. If the tubular member was retrieved and is moving with the closed end in front and the open end to the rear, such that the closed end passes first through the retrieval conduit, defined to be the forward orientation, the closed end is drawn directly into the delivery conduit through the junction and the tubular member is delivered closed end first. If the tubular member is moving through the retrieval conduit with the open end in front and the closed end in the rear, such that the open end passes first through the retrieval conduit, defined to be the reverse orientation, the suction does not turn the tubular member and it will continue linearly past the junction and across the opening to the delivery conduit, with the open end striking the closed end wall of the reversing chamber and the remainder of the tubular member collapsing against the closed end wall such that the closed end passes over the opening, where it is then drawn into the delivery conduit and delivered with the closed end in front and the open end in the rear. Typically the tubular members are deposited onto one or more thin rods or similar members, where the suction or gravity effects causes the tubular member to invert as the closed end meets the tip of the rods so that the main body of the tubular member is pulled over the rods.

DETAILED DESCRIPTION OF THE INVENTION

With reference to the drawings, the invention will now be described in detail with regard for the best mode and the preferred embodiment. In a general sense, the invention is an apparatus for handling, orienting and delivering elastic, thin-walled, generally elongated, tubular members having an open end, usually terminating in a ring of rolled wall material, and a closed end, such as finger cots, condoms, balloons or the like, where the tubular members are individually transported through suction conduits from a first location to a second location, where the invention results in the tubular members being delivered to the second location such that all are oriented in the same direction relative to the open and closed ends, regardless of the orientation direction of each tubular member when it is received from the first location.

The tubular members 20 are generally elongated, such that the longitudinal axial length is significantly greater than the cross-sectional diameter. The tubular members 20 relative to the longitudinal axis, have a closed end 21, which is generally rounded or provided with a nipple shape, and an opposing open end 22, which may be formed with a portion of the wall material rolled to create a small ring member. The tubular members 20 have very thin walls and are formed of an elastic material such as a polymer, synthetic rubber or like material, and are non-rigid and flexible unless placed or stretched onto a more rigid supporting framework of some type. Examples of such tubular members 20 include finger cots, condoms and balloons.

Figure 1:
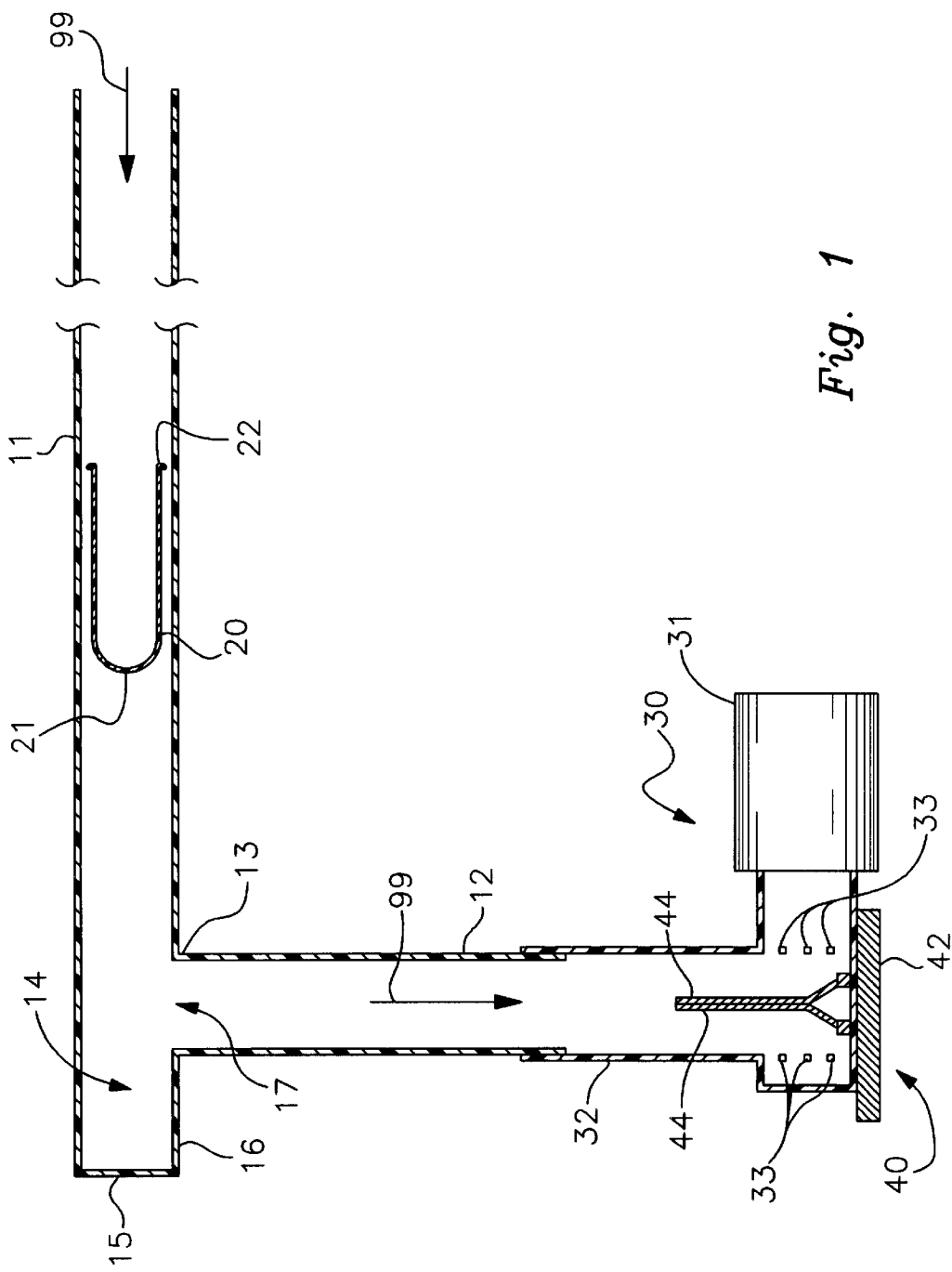
FIG. 1 is a cross-sectional view of the invention.

As shown in FIG. 1, the invention may be defined as a component in a suction transport system, which in turn may be a component in a larger, more elaborate handling apparatus for tubular members 20, such as for example condom or finger cot testing equipment where the tubular members 20 must be individually tested for leaks. An example of such handling and testing equipment is shown in U.S. Pat. Nos. 5,499,898 and 5,564,552 issued to Vonier et al., the disclosure of which is incorporated herein by reference.

The main components of the invention comprise a retrieval conduit 11, a reversing chamber 14 and a delivery conduit 12, where the delivery conduit 12 is connected to the retrieval conduit 11 at an angled junction 13, preferably a right angle of 90 degrees, which defines a opening 17, preferably downward facing, to the delivery conduit 12. The retrieval conduit 11 and delivery conduit 12 are preferably circular in transverse cross-section, and may be formed of rigid or flexible tubing, or they may comprise bores formed in blocks of solid material. Suction means 30 are provided to create a flow direction 99 through the conduits 11 and 12, with suction means 30 comprising any suitable system for producing sufficient negative pressure to draw the tubular members 20 through the conduits 11 and 12. The minimum negative pressure produced by the suction means 30 must be sufficient to impart enough forward momentum or velocity to the tubular members 20 traveling through the retrieval conduit 11 such that tubular members 20 oriented with the open end 22 forward will not be immediately drawn into delivery conduit 12 but will pass across the opening 17 to the delivery conduit 12. The maximum negative pressure must be below a limit where all tubular members 20 are immediately drawn through opening 17 from retrieval conduit 11 regardless of orientation. The values for this acceptable pressure range will vary depending on numerous factors, such as for example the particular size, wall thickness and material of construction of the tubular members 20, the length and positioning of the conduits 11 and 12, etc.

As shown in FIG. 1, a relatively simple suction means 30 comprises a vacuum pump 31 connected to a vacuum chamber or drop chute 32, the vacuum chamber 32 having suction ports 33 for air flow, preferably evenly spaced circumferentially so that the suction is drawn equally from all transverse directions. The delivery conduit 12 is connected to and delivers the tubular member 20 into the vacuum chamber 32, where it is deposited onto movable tubular member receiving means 40 for further handling of the tubular member 20, shown as comprising at least one and preferably plural, generally vertically oriented, receiving rods 41 situated on a rod mount 42. Such receiving means 40 are known in the industry, and are structured such that the rods 41 can be separated to stretch the tubular member 20 onto a mandrel. It is contemplated that alternative structures and designs for the suction system 30 may also be suitable, and alternatives for the receiving means 40 structure are also contemplated, without departing from the spirit of the invention.

Retrieving conduit 11 retrieves or receives individual tubular members 20 in successive fashion, and may for example be utilized to retrieve tubular members 20 in random orientation directly from a hopper or other container into which a large number of tubular members 20 have been placed. Preferably, retrieving conduit 11 is relatively long, on the order of several feet, such that the tubular members 20 are straightened out after retrieval and become generally longitudinally oriented during passage through the retrieval conduit 11 due to contact with the interior wall of the retrieval conduit 11, the friction effects causing the tubular members 20 to travel in either the forward orientation, where the closed end 21 is to the front and the open end 22 is to the rear, relative to the flow direction 99, with the closed end 21 passing first through the retrieval conduit 11, or in the rearward orientation, where the closed end 21 is to the rear and the open end 22 is to front, with the open end 22 passing first through the retrieval conduit 11.

The delivery conduit 12 is connected in communicating manner to the retrieval conduit 11, such that air and the tubular members 20 flow from the retrieval conduit 11 into and through the delivery conduit 12. The junction 13 between the conduits 11 and 12 is an angular connection, preferably at or close to 90 degrees, and preferably the opening 17 in delivery conduit 12 is disposed on the underside of the retrieval conduit 11 at the junction 13 so as to be below the retrieval conduit 11 and the reversing chamber 14 in this area. Preferably delivery conduit 12 is relatively short, such that only a small distance needs to be traversed prior to delivery of the properly oriented tubular member 20 onto or into whatever tubular member receiving means 40 is provided in a given system. As shown for illustrative purposes, receiving means 40 may comprise one or more receiving rods 41, which may be later used to transfer the tubular member 20 onto a mandrel or like object for further handling, testing, imprinting, etc.

A reversing chamber 14 is provided on the opposite side of the retrieving conduit 11 beyond the junction 13 and opening 17, and may comprise a short extended portion of the retrieval conduit 11 itself. The reversing chamber 14 comprises an end wall or barrier member 15 disposed preferably perpendicularly to the longitudinal axis or direction of travel of the tubular members in the retrieval conduit 11 and a wall 16, preferably tubular and preferably of the same inner diameter as the retrieval conduit 11. Most preferably, the reversing chamber 14 extends linearly or coaxially from the retrieval conduit 11 adjacent the opening 17, such that the combination of the retrieval conduit 11 adjacent the junction 13, the delivery conduit 12 adjacent the junction 13, and the reversing chamber 14 define a generally T-shaped structure. As shown in FIGS. 2 through 9, an actual T-connector member 19 may be used to construct the invention, where the ends of the retrieval conduit 11 and delivery conduit 12 are joined to the T-connector member 19 in known manner, with an end cap inserted in or on the remaining opening of the T-connector member 19 to form the barrier member 15 of the reversing chamber 14. Barrier member 15 could also be formed of a screen or apertured material. The length of the reversing chamber 14 as determined by the location of the barrier member 19 relative to the opening 17 is relatively short and is determined by the length of the tubular members 20 being handled, and is preferably less than the length of the tubular members 20 when in a straightened but unstretched state, and most preferably of a length such that the length of the reversing chamber 14 plus the distance across opening 17 is less than the length of the tubular members 20 when in a straightened but unstretched state. Thus for example, for use with tubular members 20 which are finger cots approximately 1.5 to 2 inches in length, a suitable distance for the barrier member 19 to be positioned beyond the opening 17 to the delivery conduit 12 is about one inch. Likewise, the inner diameter dimension of the conduits 11 and 12 and the reversing chamber 14 is also a factor determined by the outer diameter of the tubular members 20 being handled, as the travel of the tubular members 20 should not be overly restricted by the inner walls of the conduits 11 and 12 and reversing chamber 14. Thus for tubular members 20 about 0.5 inches in diameter, an inner diameter of from about 0.625 to 1 inch is suitable.

Figure 2:
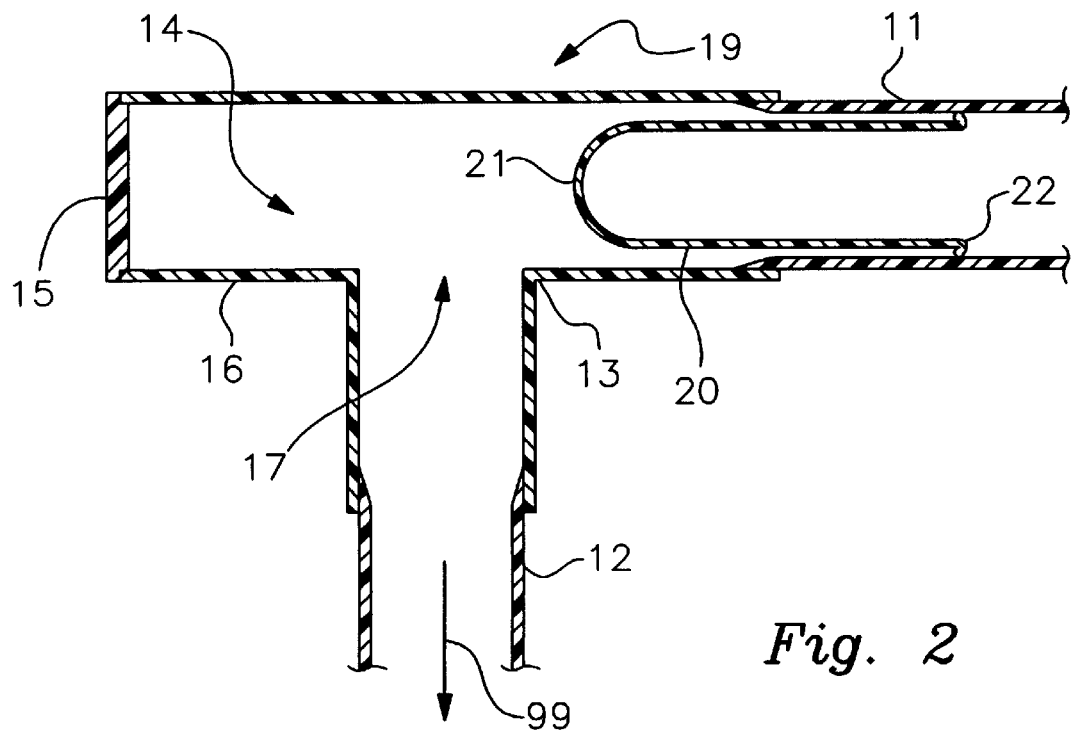
FIG. 2 is a cross-sectional partial view showing a tubular member passing through the retrieval conduit in the forward orientation.
Figure 3:
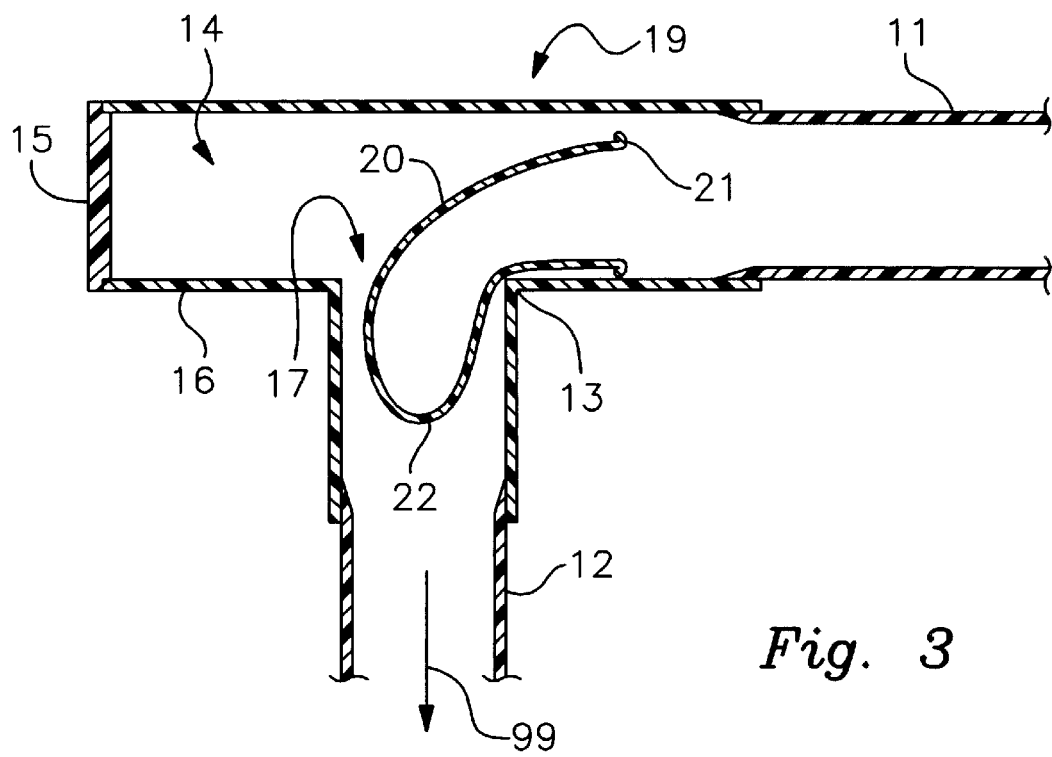
FIG. 3 is cross-sectional partial view showing the tubular member of FIG. 2 passing through the junction.
Figure 4:
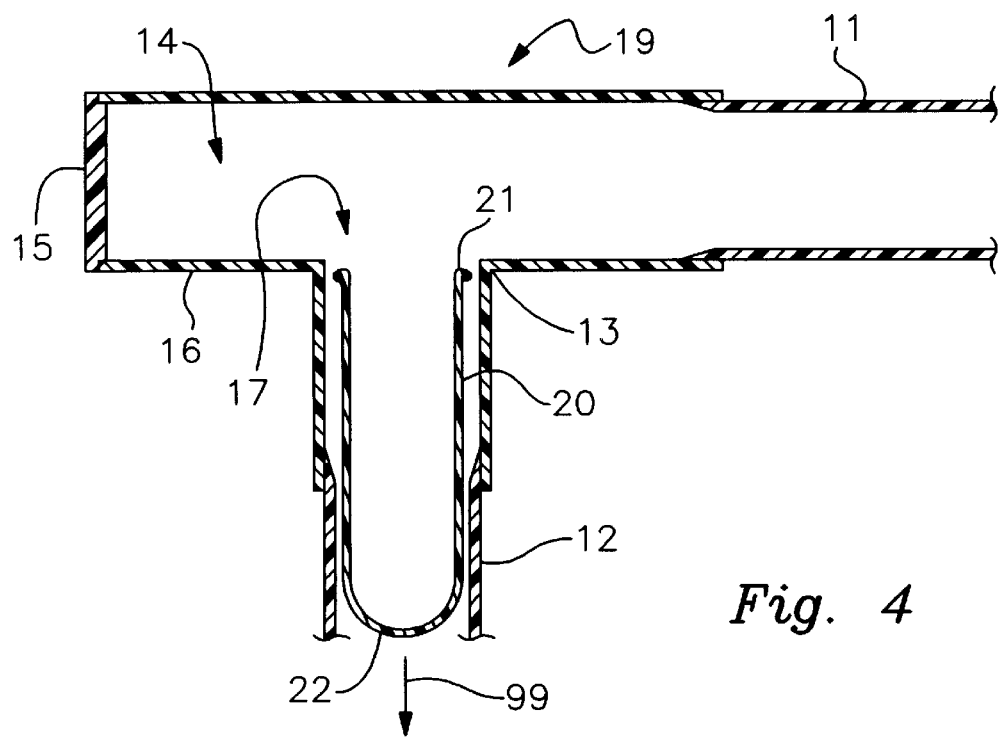
FIG. 4 is a cross-sectional partial view showing the tubular member of FIG. 3 passing through the delivery conduit in the forward orientation.

The orienting operation is illustrated in FIGS. 2 thorough 4 for a tubular member 20 proceeding through the retrieval conduit 11 in the forward orientation with the closed end 21 to the front relative to the flow direction 99, as seen in FIG. 2. As the tubular member 20 reaches the delivery conduit opening 17 at the junction 13, the suction within the delivery tube 12 is sufficient to draw the closed end 21 into the opening 17 to turn the tubular member 20, as shown in FIG. 3, so that the tubular member 20 is drawn directly into the delivery conduit 12 in the forward orientation relative to the flow direction 99. With the system as shown in FIG. 1, the closed end 21 of the tubular member 20 will be delivered or dropped onto the upper end of the receiving rods 41, and suction effects will cause the tubular member 20 to invert onto the rods 41, such that the open end 22 is positioned below closed end 21 and the tubular member 20 is suspended on the rods 41.

Figure 5:
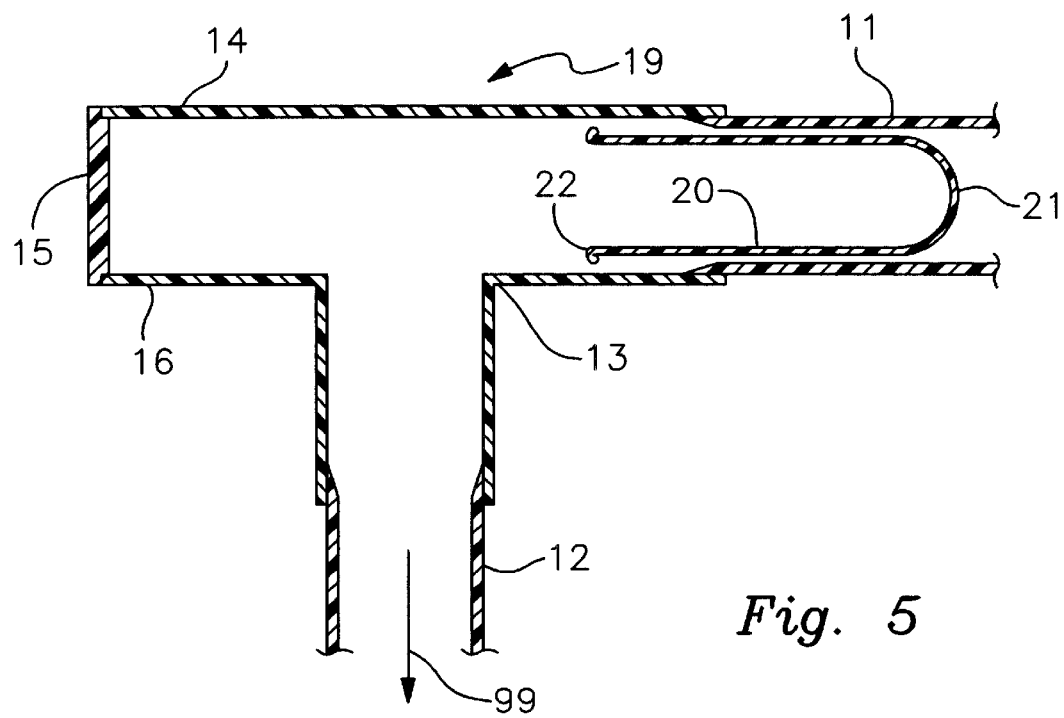
FIG. 5 is a cross-sectional partial view similar to FIG. 2 but showing a tubular member passing through the retrieval conduit in the reverse orientation.
Figure 6:
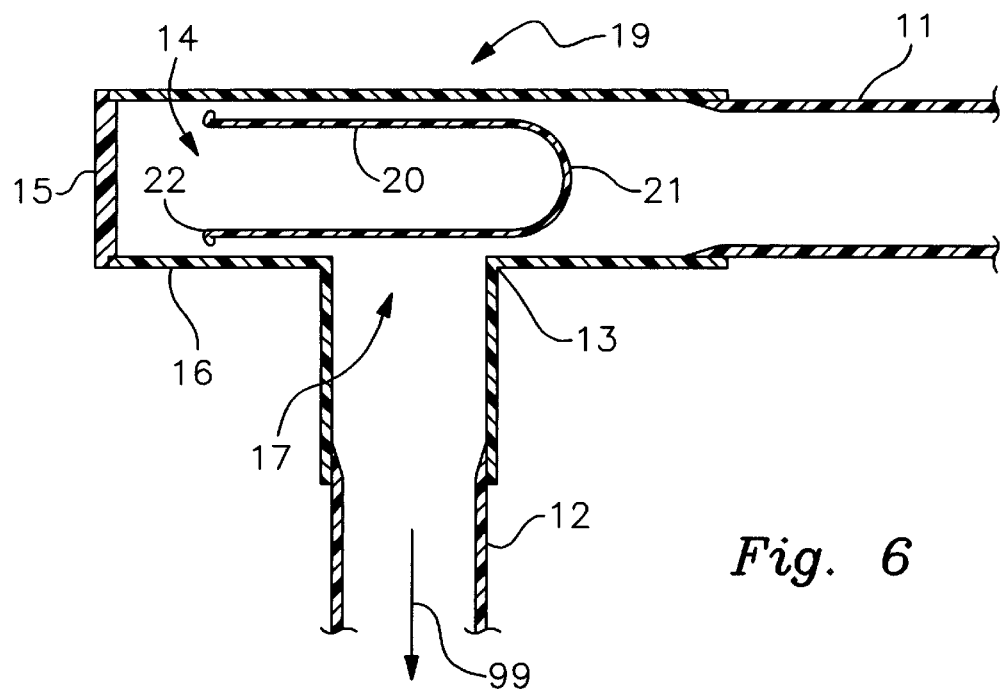
FIG. 6 is cross-sectional partial view showing the tubular member of FIG. 5 passing above the junction.
Figure 7:
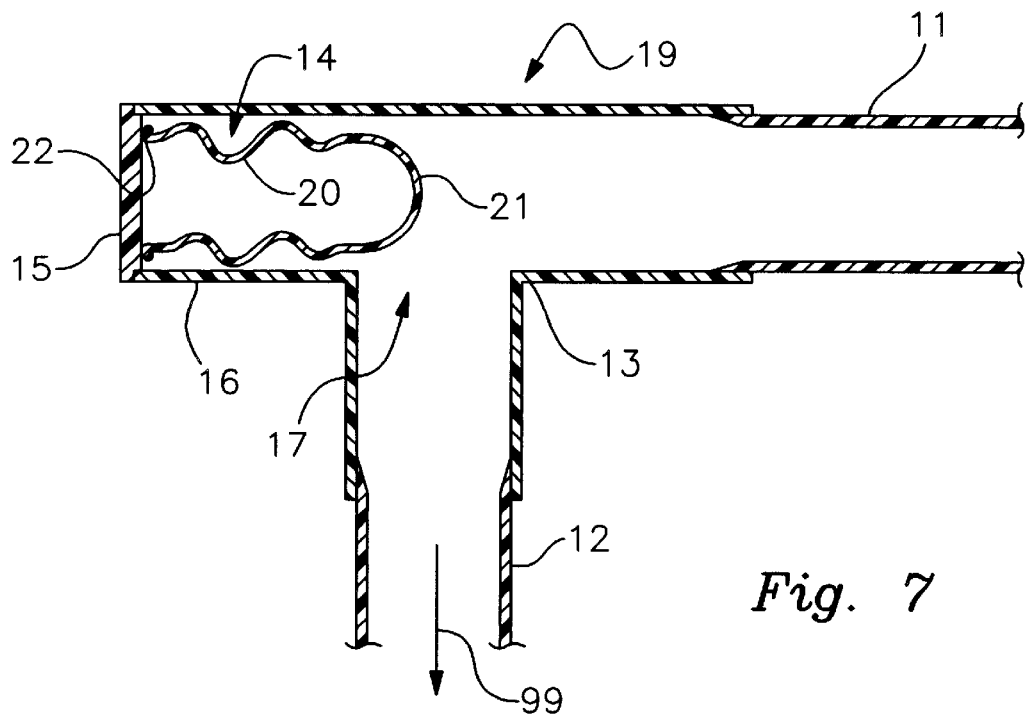
FIG. 7 is a cross-sectional partial view showing the tubular member of FIG. 6 striking the closed end wall of the reversal chamber.
Figure 8:
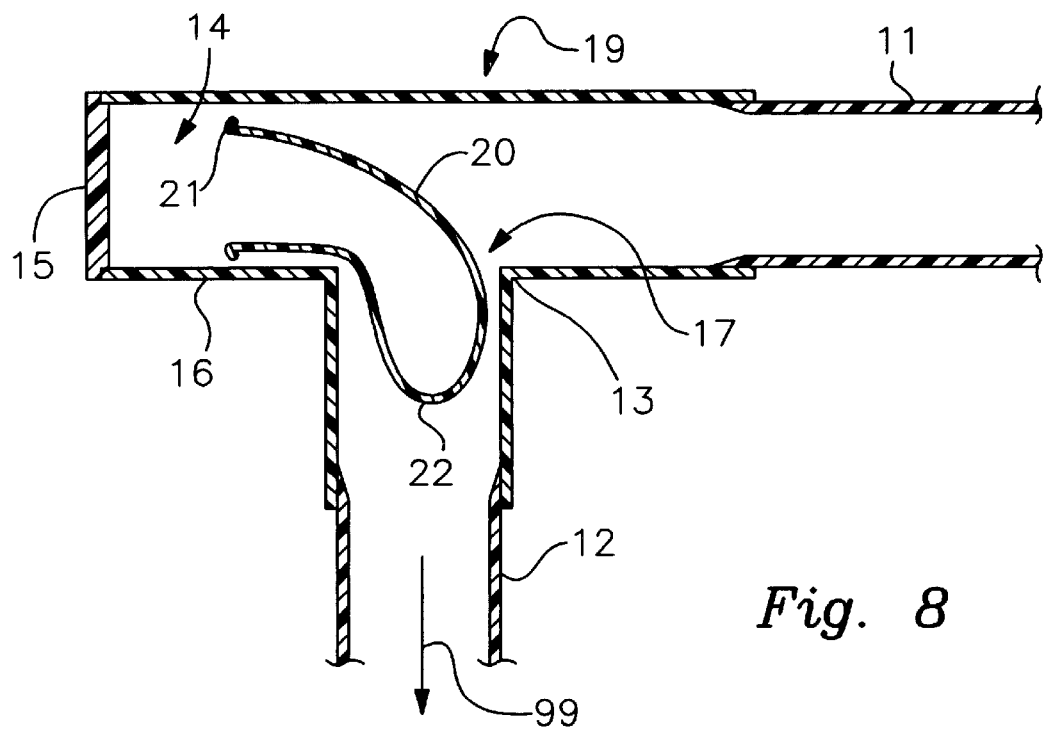
FIG. 8 is a cross-sectional partial view showing the tubular member of FIG. 7 passing through the junction.
Figure 9:
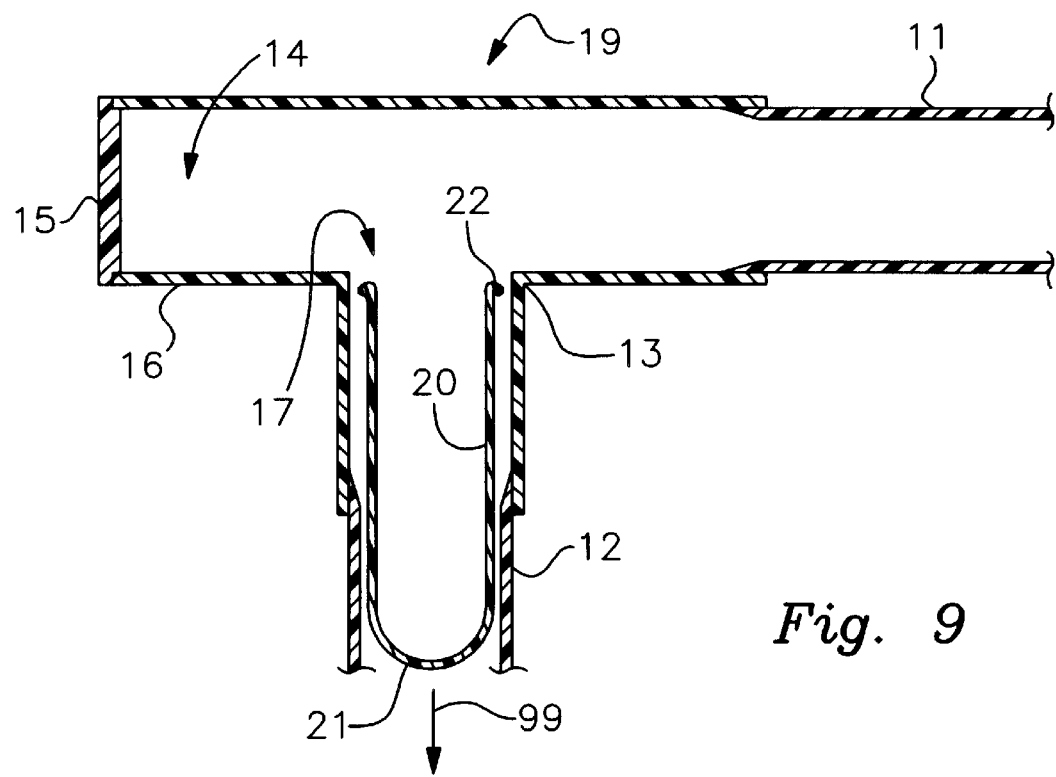
FIG. 9 is a cross-sectional partial view showing the tubular member of FIG. 8 passing through the delivery conduit in the forward orientation.

The orienting operation is illustrated in FIGS. 5 through 9 for a tubular member 20 proceeding through the retrieval conduit 11 in the reverse orientation with the open end 22 to the front relative to the flow direction, as shown in FIG. 5. As the tubular member 20 reaches the junction 13 between the retrieval conduit 11 and the delivery conduit 12, the suction within the delivery tube 12 does not draw the open end 22 into the opening 17 of the delivery conduit 12 due to the minimal amount of surface area presented toward the opening 17, such that the tubular member 20 is not turned into the delivery conduit 12. Instead, inertia causes the tubular member 20 to continue traveling linearly forward along the longitudinal axis so that it passes across the delivery conduit opening 17, as shown in FIG. 6. The open end 22 of the tubular member 20 strikes the barrier member 15 of the reversing chamber 14 and the tubular member 20 compresses or folds, as shown in FIG. 7, to the point where the closed end 21 of the tubular member 20 passes across the delivery conduit opening 17. The relatively larger surface area of the closed end 21 of the tubular member 20 means the suction within the delivery tube 12 is now sufficient to pull the closed end 21 into the opening 17, as shown in FIG. 8, such that the tubular member 20 is now positioned in the forward orientation as it is pulled through the delivery conduit 12, as shown in FIG. 9.

It is to be understood that certain equivalents and substitutions to the elements set forth above may be obvious to one skilled in the art without departing from the spirit of the invention, and therefore the true scope and definition of the invention is to be as set forth in the following claims.

We claim:

1. An apparatus for handling, orienting and delivering elastic, elongated, thin-walled tubular members having a closed end and an open end from a system feeding elastic, elongated, thin-walled tubular members in a random orientation, the apparatus comprising:

a retrieval conduit adapted to receive individual elastic, elongated, thin-walled tubular members in random orientation, whereby some of said tubular members travel through said retrieval conduit in forward orientation, whereby the closed end of the tubular member passes first through said retrieval conduit, and whereby the remainder of said tubular members travel through said retrieval conduit in reverse orientation, whereby the open end of the tubular member passes first through said retrieval conduit;

a delivery conduit adapted to receive said individual tubular members from said retrieval conduit and which is adapted to deliver all said individual tubular members in the forward orientation, said delivery conduit connected to said retrieval conduit in communicating manner at an angular junction which defines an opening between said retrieval conduit and said delivery conduit;

a reversing chamber connected to said retrieval conduit and positioned beyond said opening to said delivery conduit, said reversing chamber having a barrier member adapted to block the forward travel of said individual tubular members; and suction means which draws said individual tubular members through said retrieval conduit and said delivery conduit;

whereby said closed ends of said individual tubular members traveling through said retrieval conduit in the forward orientation are drawn directly into said delivery conduit in the forward orientation, and whereby said open ends of said individual tubular members traveling through said retrieval conduit in the reverse orientation first pass across said opening and enter said reversing chamber, said open ends of said individual tubular members striking said barrier member of said reversing chamber, such that said closed ends of said individual tubular members are then drawn into said delivery conduit in the forward orientation.

2. The apparatus of claim 1, wherein said reversing chamber is linearly disposed relative to said retrieval conduit adjacent said opening.

3. The apparatus of claim 1, wherein said junction between said retrieval conduit and said delivery conduit is approximately 90 degrees.

4. The apparatus of claim 1, wherein the combination of said junction and said reversing chamber is generally T-shaped.

5. The apparatus of claim 1, wherein said retrieval conduit, said delivery conduit and said reversing chamber are circular in transverse cross-section.

6. The apparatus of claim 1, wherein said opening to said delivery conduit is positioned below said retrieval conduit and said reversing chamber.

7. The apparatus of claim 1, wherein the distance from said barrier member to said opening is less than the length of said tubular members.

8. The apparatus of claim 1, wherein the distance from said barrier member to said opening plus the distance across said opening is less than the length of said tubular members.

9. The apparatus of claim 1, further comprising movable receiving means for receiving such individual tubular members from said delivery conduit.

10. The apparatus of claim 9, wherein said receiving means comprises at least one receiving rod, said at least one receiving rod being generally vertically oriented, whereby such tubular members are delivered from said delivery conduit onto said at least one receiving rod.

* * * * *